one side thereof an air chamber and on the other side thereof a clinker receiving chamber, said partition fitting the shell closely at its under side and having about the upper side an opening for the passage of air from the air chamber to the clinker receiving chamber, and means to supply air to the chamber.

5. In a rotary cooler, the combination of a rotary shell open at the discharge end, means to supply to the shell at the other end the material to be cooled, a hood surrounding the discharge end of the shell, a partition across said shell and forming on one side thereof an air chamber and on the other side thereof a clinker receiving chamber, said partition fitting the shell closely at its under side and having about the upper side an opening for the passage of air from the air chamber to the clinker receiving chamber, a conical guard flange for said opening to direct movement of air into the air chamber, and means to supply air to the chamber.

6. In a rotary cooler, the combination of a rotary shell, an air seal surrounding the shell, and a support for the air seal, said air seal comprising a flanged ring on the shell, tightening rings secured to said flange, a sealing ring received between the tightening rings and non-metallic rings interposed between the sealing ring and the tightening rings.

7. In a rotary cooler, the combination of a rotary shell, an air seal surrounding the shell, and a support for the air seal, said air seal comprising a flanged ring on the shell, tightening rings secured to said flange, a sealing ring received between the tightening rings, and means to prevent rotation of the sealing ring.

8. In a rotary cooler, the combination of a rotary shell, an air seal surrounding the shell, and a support for the air seal, said air seal comprising a flanged ring on the shell, tightening rings secured to said flange, a sealing ring received between the tightening rings, means to prevent rotation of the sealing ring, one of the tightening rings having pockets or recesses, bolts passed through said flange and said tightening rings and through said pockets or recesses, nuts applied to said bolts within the recesses of the one ring to hold the other ring to the flange and nuts applied to said bolts outside of the recessed ring to hold the same in place.

This specification signed this 3d day of June A. D. 1924.

POVL T. LINDHARD.

July 7, 1925.
A. F. MASURY ET AL
1,545,056
CUSHION CONNECTION FOR VEHICLE CONSTRUCTION
Original Filed March 14, 1922
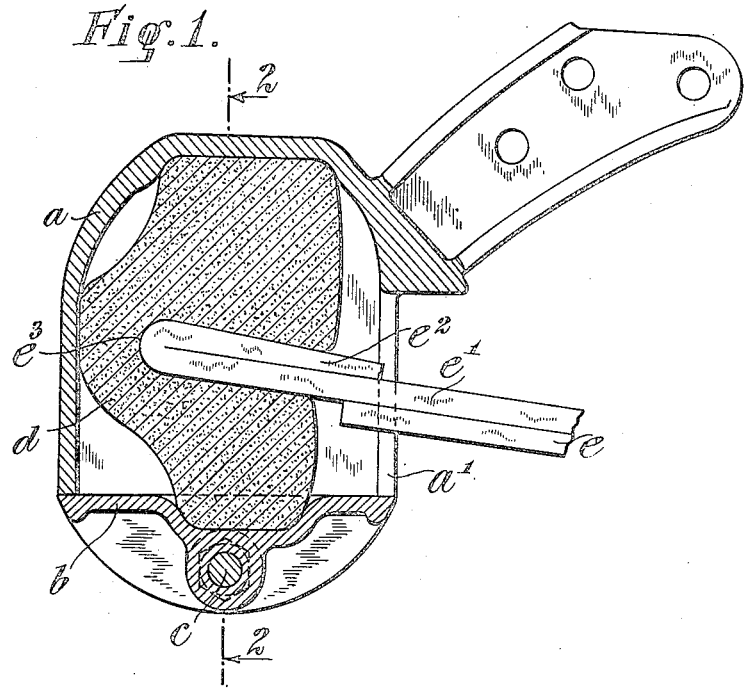
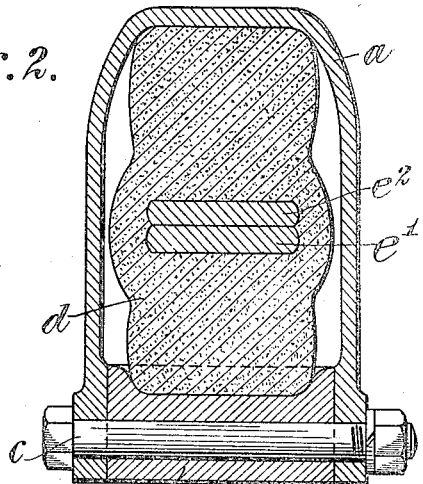
INVENTORS
Alfred F. Masury
August A. Seifert
BY
ATTORNEYS